(12) United States Patent
Lietz et al.

(10) Patent No.: US 9,177,695 B2
(45) Date of Patent: Nov. 3, 2015

(54) BATTERY LEAD

(75) Inventors: Franz-Josef Lietz, Oberhausen-Lirich (DE); York Dlugokinski, Eglharting (DE)

(73) Assignee: AUTO KABEL MANAGEMENTGESELLSCHAFT MBH, Hausen (DE)

( * ) Notice: Subject to any disclaimer, the term of this patent is extended or adjusted under 35 U.S.C. 154(b) by 1339 days.

(21) Appl. No.: 12/282,724

(22) PCT Filed: Oct. 19, 2007

(86) PCT No.: PCT/EP2007/061203
§ 371 (c)(1),
(2), (4) Date: Oct. 20, 2008

(87) PCT Pub. No.: WO2008/049788
PCT Pub. Date: May 2, 2008

(65) Prior Publication Data
US 2009/0104514 A1      Apr. 23, 2009

(30) Foreign Application Priority Data

Oct. 24, 2006   (DE) .................. 10 2006 050 705

(51) Int. Cl.
*H01B 7/08* (2006.01)
*H01M 2/20* (2006.01)
*H01M 2/30* (2006.01)

(52) U.S. Cl.
CPC . *H01B 7/08* (2013.01); *H01M 2/20* (2013.01); *H01M 2/30* (2013.01); *Y10T 29/49204* (2015.01)

(58) Field of Classification Search
None
See application file for complete search history.

(56) References Cited

U.S. PATENT DOCUMENTS

| | | | |
|---|---|---|---|
| 1,946,862 A * | 2/1934 | Koch, Jr. ................... | 439/791 |
| 3,220,891 A | 11/1965 | Templeton et al. | |
| 3,512,221 A | 5/1970 | Schoerner .................. | 29/183.5 |
| 3,630,725 A | 12/1971 | Cofer .......................... | 75/138 |
| 3,688,548 A | 9/1972 | Kawaguchi et al. ........ | 72/234 |
| 3,706,955 A | 12/1972 | Bunnell ...................... | 339/28 |
| 3,952,571 A | 4/1976 | Yokota et al. ............... | 72/286 |
| 4,034,271 A | 7/1977 | Palazzetti et al. ........... | 361/332 |

(Continued)

FOREIGN PATENT DOCUMENTS

| | | | | |
|---|---|---|---|---|
| DE | 2321892 | 11/1973 | ............. | H02B 3/02 |
| DE | 2745189 | 4/1979 | ............. | H01M 2/30 |

(Continued)

OTHER PUBLICATIONS

European Patent Office, Baeza Félez, European Patent Search Report dated Oct. 18, 2010, EP 09170629, filed Jun. 28, 2010, 7 pages.

(Continued)

*Primary Examiner* — Alix Eggerding
(74) *Attorney, Agent, or Firm* — Sunstein Kann Murphy & Timbers LLP

(57) ABSTRACT

Motor vehicle battery lead with a first connection element for a battery pole, a second connection element for at least one consumer, and a flat conductor arranged between the first connection element and the second connection element. A modular construction with a high degree of flexibility is achieved, in that the flat conductor is formed in a number of parts, wherein at least two parts of the multi-part flat conductor are connected to each other over the course of the flat conductor.

23 Claims, 3 Drawing Sheets

(56) References Cited

U.S. PATENT DOCUMENTS

| | | | |
|---|---|---|---|
| 5,019,188 A | 5/1991 | Hasenclever | 148/11.5 |
| 5,370,028 A | 12/1994 | Grebe | 83/684 |
| 5,528,820 A | 6/1996 | Collier | 29/605 |
| 5,530,625 A | 6/1996 | VanDerStuyf et al. | 361/794 |
| 5,687,602 A | 11/1997 | Saen et al. | 72/202 |
| 5,771,966 A | 6/1998 | Jacoby | 165/185 |
| 5,912,610 A | 6/1999 | Marinos et al. | 336/197 |
| 6,203,343 B1 | 3/2001 | Chevassus-More et al. | 439/210 |
| 6,221,185 B1 | 4/2001 | Tanzmann et al. | 148/569 |
| 6,350,355 B1 | 2/2002 | Cloostermans-Huwaert | 204/280 |
| 6,573,454 B2 | 6/2003 | Fujiwara | 174/74 R |
| 6,692,314 B1* | 2/2004 | Pares Caselles | 439/801 |
| 6,743,396 B2 | 6/2004 | Wagner et al. | 420/534 |
| 7,182,825 B2 | 2/2007 | Unal et al. | 148/551 |
| 2002/0025717 A1 | 2/2002 | Balzano | 439/489 |
| 2003/0077483 A1* | 4/2003 | Streuer et al. | 429/1 |
| 2006/0159987 A1* | 7/2006 | Kikuchi et al. | 429/121 |
| 2007/0141458 A1* | 6/2007 | Nagatani et al. | 429/158 |

FOREIGN PATENT DOCUMENTS

| | | | | |
|---|---|---|---|---|
| DE | 421020 | 9/1993 | | H02B 1/20 |
| DE | 4210202 | 9/1993 | | H02B 1/20 |
| DE | 4343967 A1 | 6/1994 | | H01R 35/04 |
| DE | 10001632 A1 | 8/2001 | | H01H 3/32 |
| DE | 102006031839 | 1/2008 | | H01R 43/16 |
| EP | 0394816 | 10/1990 | | C22C 21/00 |
| EP | 1247873 | 10/2002 | | C22F 1/04 |
| EP | 1349180 | 10/2003 | | H01B 7/08 |
| FR | 2 867 317 | 9/2005 | | H02G 3/08 |
| JP | 6-200346 | 7/1994 | | C22C 21/06 |
| JP | 2004-298947 | 10/2004 | | B21C 47/02 |
| WO | WO 2005/081267 | 9/2005 | | H01B 7/08 |
| WO | WO 2006/082238 | 8/2006 | | H01B 7/40 |
| WO | WO 2007/134634 | 11/2007 | | H02G 3/22 |

OTHER PUBLICATIONS

*International Preliminary Report on Patentability*, International Application No. PCT/EP2007/061203; Date of Mailing: Jan. 18, 2008 (German).

*International Search Report*, International Application No. PCT/EP2007/061203; Date of Mailing: Jan. 18, 2008 (English).

Abstract (English) of foreign patent document WO 2007/134634. Abstract provided by esp@cenet database—Worldwide.

Abstract (English) of foreign patent document WO 2006/082238 A1. Abstract provided by esp@cenet database—Worldwide.

Abstract (English) of foreign patent document FR 2 867 317. Abstract provided by esp@cenet database—Worldwide.

European Patent Office, Netherlands, European Search Report dated Jun. 1, 2011, Application No. 11164398.7-1264, 7 pages.

Germany Patent and Trademark Office, Office Action, Application No. 102006050705.3-34, dated Aug. 17, 2007, 3 pages.

The Patent Office of the People's Republic of China, Office Action, Application No. 200780011659.5, dated Apr. 13, 2010, 2 pages.

International Searching Authority, International Search Report—International Application No. PCT/EP2006/050187, dated Apr. 4, 2006, together with the Written Opinion of the International Searching Authority, 10 pages.

The International Bureau of WIPO, Translation of the International Preliminary Report on Patentability, International Application No. PCT/EP2006/050187, dated Jan. 10, 2008, 7 pages.

European Patent Office, European Search Report, Application No. 05012641.6, dated Mar. 31, 2006, 3 pages.

European Patent Office, Extended European Search Report, Application No. 11168031.0, dated May 12, 2014, 6 pages.

United States Patent and Trademark Office, Office Action, U.S. Appl. No. 11/815,145, dated Oct. 14, 2009, 6 pages.

United States Patent and Trademark Office, Office Action, U.S. Appl. No. 11/815,145, dated Jun. 21, 2010, 6 pages.

United States Patent and Trademark Office, Office Action, U.S. Appl. No. 11/815,145, dated Aug. 10, 2010, 8 pages.

United States Patent and Trademark Office, Office Action, U.S. Appl. No. 11/815,145, dated Mar. 2, 2011, 11 pages.

The State Intellectual Property Office of the People's Republic of China, First Office Action, Application No. 200680003902.4, dated Jul. 17, 2009, 6 pages.

The State Intellectual Property Office of the People's Republic of China, English Translation—First Office Action, Application No. 200680003902.4, dated Jul. 17, 2009, 6 pages.

The Patent Office of the People's Republic of China, Second Office Action, Application No. 200680003902.4, dated May 19, 2010, 4 pages.

The Patent Office of the People's Republic of China, English Translation—Second Office Action, Application No. 200680003902.4, dated May 19, 2010, 4 pages.

The State Intellectual Property Office of the People's Republic of China, Third Office Action, Application No. 200680003902.4, dated Jul. 4, 2011, 7 pages.

The State Intellectual Property Office of the People's Republic of China, English Translation—Third Office Action, Application No. 200680003902.4, dated Jul. 4, 2011, 7 pages.

European Patent Office, First Office Action, Application No. 05012641.6, dated Jul. 29, 2009, 4 pages.

European Patent Office, Second Office Action, Application No. 05012641.6, dated Jun. 1, 2011, 6 pages.

European Patent Office, Third Office Action, Application No. 05012641.6, dated Feb. 9, 2012, 6 pages.

European Patent Office, Last Office Action, Application No. 05012641.6, dated Mar. 20, 2013, 4 pages.

* cited by examiner

BATTERY LEAD

The invention relates to a motor vehicle battery lead with a first connection element for a battery pole, a second connection element for at least one consumer, and a flat conductor arranged between the first connection element and the second connection element. The invention also relates to a method for producing such a motor vehicle battery lead.

Battery leads, in particular B+ leads, in a conventional way are formed as circular conductors. In many motor vehicles it is normal to place the battery in the boot of the vehicle since the necessary installation space is available there and this space is saved in the engine compartment. In such cases the B+ leads must be taken from the battery in the boot of the motor vehicle to the alternator in the engine compartment. If circular conductors are used, this is achieved in the conventional way by laying the circular conductor in cable ducts. Installation space requirements in this case need narrow radii. The battery lead adapted to the installation space is taken through the body of the vehicle. In this case special shape requirements are needed particularly within the boot region and also within the engine compartment region, since the battery cable must be adapted to component-related requirements for the cable run. Between the boot region and the engine compartment the battery cable frequently runs through the central console or along the lower floor panel of the vehicle.

Recently, flat conductors have become popular as battery cables, particularly as B+ cables. The use of flat conductors has the advantage that smaller installation space requirements with the same conductor cross section are needed. In addition flat conductors made of aluminium with wider cross sections can be laid, so that the necessary current load-carrying capacity is always guaranteed. Also as a result of widening the conductor cross section no problems arise regarding the internal resistance of the battery cable if aluminium is used.

It was however been shown that battery cables formed from flat conductors are unwieldy if narrow bending radii are necessary. Due to the installation space requirements the battery cables must be adapted in shape, that is to say, they must be formed so that they are matched to the body and can be fitted in the intended installation space. Due to installation space requirements it happens that the flat conductors must be bent in all three spatial directions in order to meet the requirements of the available installation space. Here however there is an additional requirement that narrow radii are necessary. The battery leads in order to be matched to the existing installation space, must be bent sometimes with radii close to 0 cm. This however results in problems in producing the battery leads.

In addition, B+ leads can be several metres in length. Thus the B+ lead runs for example if laid in the boot—when the battery is fitted in the boot—along the entire length of the body to the engine compartment, wherein a number of bends are provided in the boot region and in the engine compartment region in each case. However in the vicinity of the lower floor panel arrangement the battery lead runs substantially straight. These long battery leads are problematic with respect to logistics. With modern mass production of motor vehicles "just in time" supply is essential. Additionally, various versions of a vehicle model are produced on the same assembly line. The various versions however frequently require different battery leads. In order to make these available on the assembly line in time, costly stock control is necessary, in particular if transport of long battery leads is complex.

The object according to the invention to provide a motor vehicle battery lead which meets complex installation space requirements and at the same time is easy to handle, arises from the aforementioned problems.

This object is achieved according to the invention, in that the flat conductor is formed in a number of parts, wherein at least two parts of the multi-part flat conductor are connected to each other over the course of the flat conductor.

According to the invention it was recognized that it is not absolutely necessary to produce the battery lead as one piece and make it available on the assembly line. Rather it is sufficient to fit the flat conductor just shortly before assembly. For the logistics it is advantageous if the flat conductor is formed in a number of parts. As a result of the modular construction of the battery lead, wherein a number of parts can form the entire battery lead, it is possible to be able to react to the most varied model requirements. For example it is conceivable that the cable, running inside the vehicle along the floor panel or in the central console, of the battery lead is formed in a straight line and only has different lengths and the parts of the battery lead fitted in the boot or in the engine compartment are formed differently in order to meet the requirements for the installation space in the case of different models or model versions.

The modularity of the battery lead permits individual parts, which correspondingly meet the requirements for the vehicle to be produced at the time, to be held in a sequential feeder positioned next to the assembly line. Thus it is possible shortly before assembly to make available corresponding model information whereupon the individual parts of the motor vehicle battery are connected together and brought to the assembly line.

It was been shown that it is advantageous to connect the parts of the flat conductor with a positive and/or non-positive fit and/or with a material fit. Particularly in the case of flat conductors made of aluminium a firm bond (material fit) is preferable. In this case the connection resistance can be kept low, since the insulating aluminium oxide layers can be avoided. Particularly in the case of battery leads made from non-ferrous metal, copper or brass for example, a positive or non-positive fit is sufficient in order to ensure sufficiently high conductivity of the transition. Particularly in the case of connections between aluminium and copper attention must be paid to protecting these against environmental influences, so that preferably heat shrink sleeves are provided on the connections of the parts. Other insulation, for example wrap-round foaming or extrusion is also possible.

The parts of the flat conductor particularly advantageously can be connected together by welding. It has been shown that spot welding is particularly advantageous by means of friction welding, however the parts can also be joined together by means of multi-orbital welding.

Bends in one plane can be easily produced with a flat conductor. However production becomes problematic as soon as a second bend in another plane becomes necessary. Therefore it is proposed that the first part of the flat conductor is bent in one plane parallel to the longitudinal axis of the flat conductor. Preferably the flat conductor is only bent in the one plane parallel to the longitudinal axis of the flat conductor. This has the advantage that, if the installation space requires a level run of the flat conductor, the corresponding part can be matched to the installation space.

As soon as bends in one plane perpendicular to the longitudinal axis of the flat conductor become necessary, a second part of the flat conductor can be bent accordingly. By connecting the part of the flat conductor, bent in the plane parallel to the longitudinal axis, to the part of the flat conductor, bent in the plane perpendicular to the longitudinal axis of the flat conductor, it is possible to meet installation space requirements, which need bends in all three spatial directions. The production of each individual part however remains economical.

A part of the flat conductor adapted in shape is suitable to be formed in such a manner that it is matched to the installation space requirements. The flat conductor is formed so that it is adapted to the installation space provided. Bends are formed in such a way that they meet the installation space requirements.

So that it can be bent during production with little energy consumption, it is proposed that at least one part of the flat conductor is made from aluminium, in particular annealed aluminium. Since the parts of the flat conductor are fitted in different places in the vehicle, it can be advantageous if a first part of the flat conductor is annealed and a second part of the flat conductor is made from worked, in particular cold-worked aluminium. For example the part of the flat conductor that is laid along the floor panel or in the central console can be made from worked aluminium and another part of the flat conductor, which can have a number of bends, since it is adapted in shape, can be made from annealed aluminium. This results in a combination of high rigidity and easy producibility.

In order to be able to easily form the part of the flat conductor, which is adapted in shape, we propose that at least the part of the flat conductor is rigidly elastic. Rigidly elastic means that the flat conductor is ductile but retains its shape after forming.

In order to make available narrow angles in the course of the battery lead, it is proposed that the second part is connected to the flat conductor at an angle to the longitudinal axis of the first part of its part. As a result bends, more particularly vertical angles, can be produced in the battery lead. It has been shown that in the case of narrow radii the insulation, which encapsulates the flat conductor, bulges. In order to prevent such bulging, in the case of conventional bending methods, additional measures, such as for example heating of the insulation, are necessary. In accordance with the advantageous exemplary embodiment if the part of the flat conductor is connected at an angle to the longitudinal axis of the other part, narrow radii can be provided without using complex bending methods.

In order to be able to guide the battery lead perpendicular to the longitudinal axis of a part, it is proposed that the second part of the flat conductor is connected with one of its sides to the front face of the first part of the flat conductor. As a result it is possible to provide bends, which run perpendicular to the longitudinal axis of a first part.

A further object of the invention is a method for producing such a motor vehicle battery lead, wherein at least two parts of a flat conductor are formed in a first process step, a first part is bent in a second process step and the at least two parts are connected to each other in a third process step.

Further advantages will be clear from the subordinate claims.

The invention is described in more detail below on the basis of a drawing showing exemplary embodiments, wherein.

Figure 1:
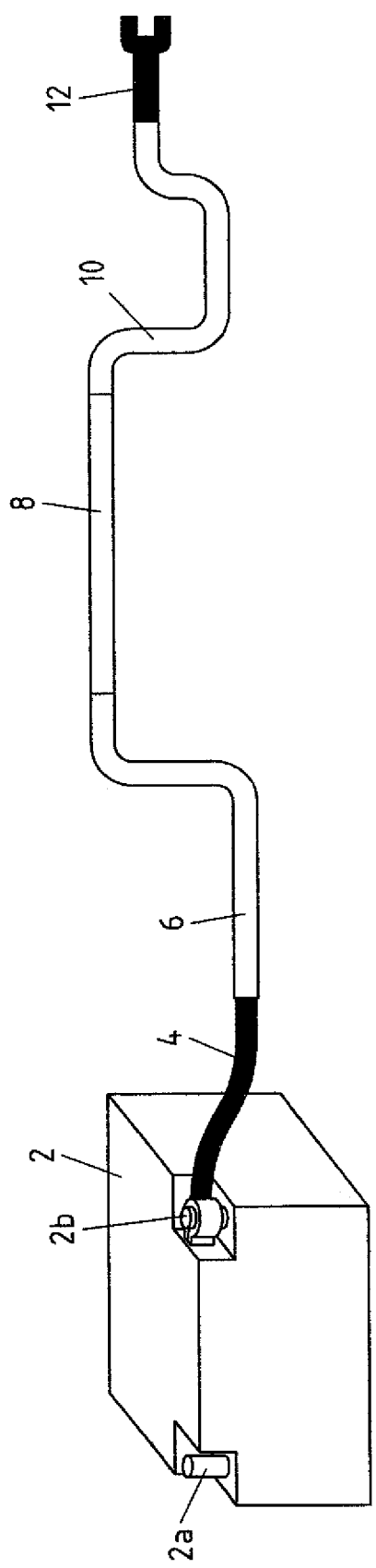
FIG. 1 shows a first arrangement with a motor vehicle battery lead according to the invention.

FIG. 1 shows a battery 2, in particular a starter battery. On the battery 2, battery poles 2a, 2b are provided to connect consumers. The battery pole 2b is preferably the B+ pole of the battery 2. A connection element 4, more particularly a flexible cable is fastened to the battery pole 2b. The connection element 4 has a battery clamp, which is screwed onto the battery pole 2b. The motor vehicle battery lead is formed from the parts 6, 8 and 10. As can be recognized the connection element 4 is connected with a firm bond to the part 6. The part 6 has bends, which are formed in such a manner that the part 6 fits into the installation space of the battery lead. The bends on the part 6 are formed in a way specific for each type so that these meet the requirements of the motor vehicle manufacturers. The part 8 is connected to the part 6. The part 8 is preferably straight, particularly if it is arranged in the central console or along the lower floor panel of the motor vehicle. A part 10, which in turn has bends, is arranged on the part 8. A connection element 12 is attached to the part 10 for connecting to an electrical consumer, in particular a consumer or generator, for example a generator such as a dynamo.

The motor vehicle battery lead consisting of parts 6, 8 and 10 is assembled just shortly before assembly. Firstly the parts 6, 8, 10 are produced separately to each other. In this case the part 6 and the part 10 are made of aluminium strip. For example it is possible that the parts 6, 10 are made of annealed aluminium strip. This aluminium strip is fed to an extruder and an insulation layer is applied onto the parts 6, 10. Afterwards the parts 6, 10 in bending devices are formed in a way specific for each type according to the installation space requirements of the motor vehicle manufacturers. The bends are preferably in one plane only.

The part 8 is produced separately from the parts 6, 10. Since the part 8 is preferably straight, bending is not necessary. The part 8 is preferably produced more rigidly than the parts 6, 10, for example from cold worked aluminium.

The parts 6, 8, 10 are transported after production to a sequential feeder. When the order has been received by the sequential feeder a battery lead is made from the parts 6, 8, 10. Here according to the order a part 6 and a part 10, which are both adapted in shape specific to the motor vehicle type, into which the battery lead is to be fitted, are used. The part 8 is welded to the part 6. In this case more particularly rotation friction welding or multi-orbital welding is employed. The part 8 has a length, which corresponds to the requirements of the type of the vehicle, into which the battery lead is to be fitted. The part 10 is also welded to the part 8. Only the battery lead produced in such a way is brought from the sequential feeder to the assembly line and fitted there. Because the battery lead must be installed just shortly before assembly, it has little demand on the logistics. It is not necessary to transport metre long battery cables over a large distance. According to the invention only the parts 6-10 must be transported and connected together just shortly before assembly.

Figure 2:
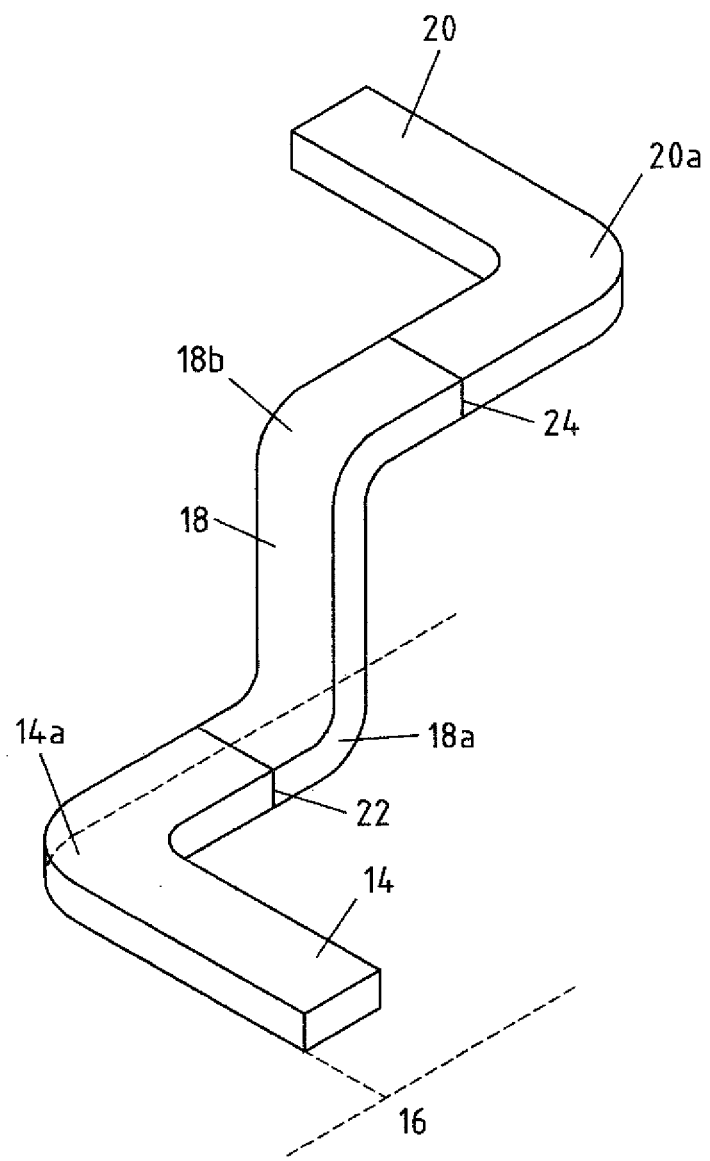
FIG. 2 shows a view of a motor vehicle battery lead with different parts and bends.

As already described, the requirements in the available installation space are becoming ever stricter, that is to say, battery leads with ever narrower angles and bends must be produced in order to fit into the tight installation space provided. In order to provide bends in different planes, the battery lead according to the invention offers a simple solution. As illustrated in FIG. 2, a part of a battery lead is made of the parts 14, 18, 20. The part 14 is bent in the plane parallel to the longitudinal axis 16 of the part 14. The bend 14a is a bend in the plane of the longitudinal axis 16. The part 18 is connected to the part 14 at the junction point 22. In the bend 18a the part 18 is curved so that it stands out from the plane of the longitudinal axis 16 of the part 14. A battery lead with the bends 14a, 18a, which in each case branch off into different planes, would be complex to produce in the conventional way. As a result of the connection 22 it is possible to form the conductor 14 in such a way that bends 14a are present only in the plane of the longitudinal axis 16. The conductor 18 has bends 18a, 18b, which are formed perpendicular to the longitudinal axis of the conductor 18. In order again to produce a bend 20a in a plane parallel to the longitudinal axis 16, the part 18 is connected to the part 20 at the junction point 24. The part 20 is again formed in such a way that the bend 20a lies in the plane parallel to the longitudinal axis 16 of the conductor 14.

As a result of the connections 22, 24 between the parts 14, 18, 20, it is possible to provide a battery lead with bends in different spatial directions. It is not necessary to make available complex production processes but the individual parts 14, 18, 20 can be custom-made and only need to be connected to each other shortly before assembly into the motor vehicle. This minimizes the complexity of production and transport costs.

Figure 3:
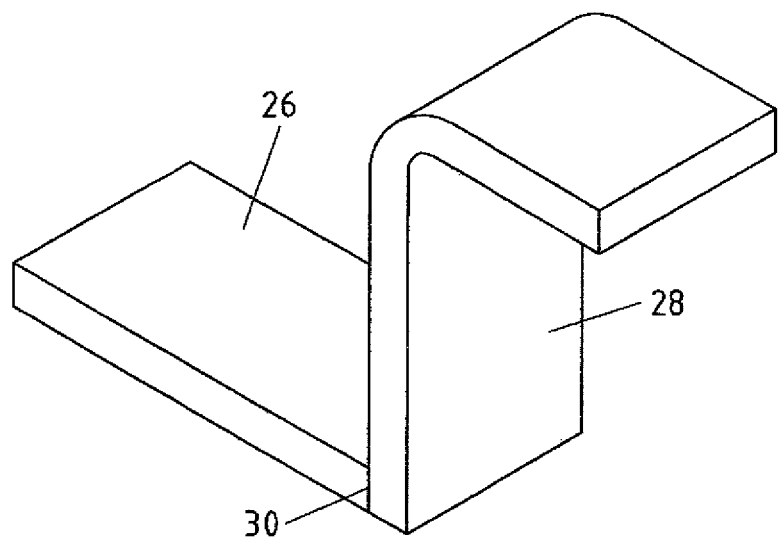
FIG. 3 shows a view of a motor vehicle battery lead with a part arranged on a front face.

FIG. 3 shows two parts 26, 28 of a battery lead, which are connected together at the junction point 30. As illustrated in FIG. 3 the part 28 is arranged with one its sides on the front face of the part 26. As a result of the arrangement of the part 28 on the front face of the part 26 a right-angled bend with a radius of almost 0° can be produced at the junction point 30a. Such a bend could not be produced with a one-piece battery lead. As a result of the connection illustrated, the battery lead according to the invention can also be adapted to extreme installation space requirements.

Figure 4:
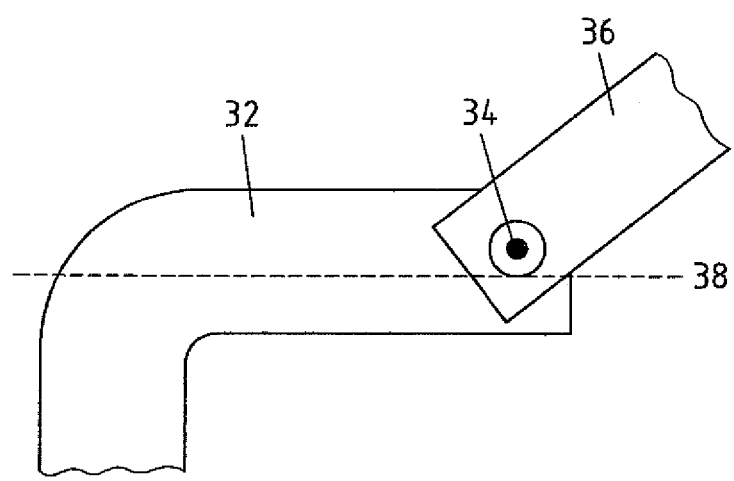
FIG. 4 shows a plan view onto an angular connection between parts of a motor vehicle battery lead.

FIG. 4 shows two parts 32, 36 of a motor vehicle battery lead. The parts 32, 36 are connected to each other with a firm bond at the junction point 34. The part 36 is arranged at an angle to the longitudinal axis 38 of the part 32. The junction point 34 is preferably produced by a rotation friction welded join.

As a result of the modular construction according to the invention of the motor vehicle battery lead, battery leads with the most diverse shapes can be produced. The individual parts of the motor vehicle battery can be easily transported and produced according to demand. Straight lines of almost 0° and right-angled bends can be produced with the aid of the modular construction of the motor vehicle battery lead.

The invention claimed is:

1. A motor vehicle battery lead comprising:
a first connection element for a battery pole, the first connection element including a flexible cable;
a second connection element for at least one consumer; and
a modular flat conductor arranged between the first connection element and the second connection element;
wherein the modular flat conductor is formed by a plurality of individual parts including at least a first part and a second part, and at least the first part and the second part of the modular flat conductor are connected to each other over the course of the modular flat conductor, and
wherein the flexible cable is materially bonded to one of the parts of the modular flat conductor and at least one of the first part or the second part of the modular flat conductor is made from soft-annealed aluminium.

2. The motor vehicle battery lead of claim 1, wherein the first part of the modular flat conductor is connected to the second part of the modular flat conductor with one or more of a positive fit, a nonpositive fit, or with a material fit.

3. The motor vehicle battery lead of claim 1, wherein the first part of the modular flat conductor is welded at least with the second part of the modular flat conductor.

4. The motor vehicle battery lead of claim 1, wherein the first part of the modular flat conductor is spot welded at least with the second part of the modular flat conductor by means of rotation welding.

5. The motor vehicle battery lead of claim 1, wherein the first part of the modular flat conductor is bent in a plane parallel to the longitudinal axis of the modular flat conductor.

6. The motor vehicle battery lead of claim 1, wherein the second part of the modular flat conductor is bent in a plane perpendicular to the longitudinal axis of the modular flat conductor.

7. The motor vehicle battery lead of claim 1, wherein at least one part of the modular flat conductor is adapted in shape to fit into an intended installation space.

8. The motor vehicle battery lead of claim 1, wherein at least one part of the modular flat conductor is made from aluminium.

9. The motor vehicle battery lead of claim 1, wherein at least one part of the modular flat conductor is formed rigidly elastic.

10. The motor vehicle battery lead of claim 1, wherein the second part of the modular flat conductor is connected to the first part of the modular flat conductor at an angle to the longitudinal axis of the first part.

11. The motor vehicle battery lead of claim 1, wherein the second part of the modular flat conductor is connected to the first part of the modular flat conductor perpendicular to the longitudinal axis of the first part.

12. The motor vehicle battery lead of claim 1, wherein the second part of the modular flat conductor is connected with one of its sides to the front face of the first part of the modular flat conductor.

13. The motor vehicle battery lead of claim 1, wherein the second part of the modular flat conductor is arranged in a central console or along a vehicle floor between a vehicle boot and a vehicle front.

14. The motor vehicle battery lead of claim 1, wherein the first part of the modular flat conductor is arranged in a vehicle boot, the second part of the modular flat conductor guides the motor vehicle battery lead to an engine compartment, and a third part of the modular flat conductor is located in the engine compartment.

15. A method for producing a motor vehicle battery lead, the method comprising:
soft-annealing a first individual flat conductor part or a second individual flat conductor part;
forming the first individual flat conductor part;
forming the second individual flat conductor part;
bending the first individual flat conductor part;
connecting the first individual flat conductor part and the second individual flat conductor part to each other to construct a flat conductor; and
materially bonding the first flat conductor part of the flat conductor to a flexible cable, the flexible cable arranged to perform as a first connection element.

16. The method of claim 15, wherein bending the first individual flat conductor part comprises bending in one plane parallel to its longitudinal axis.

17. The method of claim 15, further comprising bending the second individual flat conductor part in one plane perpendicular to its longitudinal axis.

18. The method of claim 15, wherein in the forming and bending steps are carried out in a first production line, the parts are then sent for sequential production, and connecting is carried out during the sequential production.

19. The method of claim 15, wherein connecting comprises connecting the second individual flat conductor part to the first individual flat conductor part at an angle to the longitudinal axis of the first individual flat conductor part.

20. The method of claim 15, wherein connecting comprises connecting the second individual flat conductor part to the first individual flat conductor part at an angle in one plane perpendicular to the longitudinal axis of the first individual flat conductor part.

21. The method of claim 15, wherein connecting comprises connecting the second individual flat conductor part to the first individual flat conductor part with a material fit.

22. A motor vehicle battery lead comprising:
   a first connection element for a battery pole, the first connection element including a flexible cable;
   a second connection element for at least one consumer; and
   a modular flat conductor arranged between the first connection element and the second connection element;
   wherein the modular flat conductor is formed by a plurality of individual parts including at least a first part and a second part, and at least the first part and the second part of the modular flat conductor are connected to each other over the course of the modular flat conductor, and
   wherein at least one of the first part or the second part of the modular flat conductor is made from soft-annealed aluminium.

23. The motor vehicle battery lead of claim 22, wherein the flexible cable is material fitted with the one of the parts of the modular flat conductor.

\* \* \* \* \*